S. SÖRBY.
EDUCATIONAL APPLIANCE FOR PRACTICING PENMANSHIP.
APPLICATION FILED JAN. 7, 1920.
1,414,102.
Patented Apr. 25, 1922.
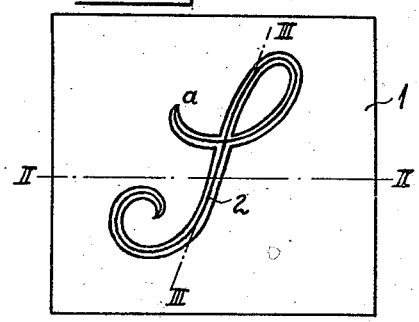
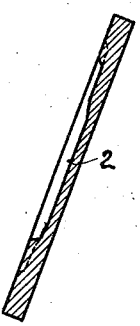
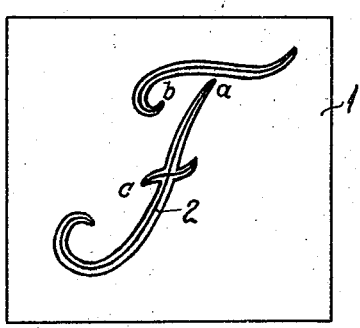
Inventor
S. Sörby
By H.R. Kerslake
Attorney

UNITED STATES PATENT OFFICE.

SIGVART SÖRBY, OF KONGSBERG, NORWAY.

EDUCATIONAL APPLIANCE FOR PRACTICING PENMANSHIP.

1,414,102.  Specification of Letters Patent.  Patented Apr. 25, 1922.

Application filed January 7, 1920. Serial No. 349,965.

*To all whom it may concern:*

Be it known that I, SIGVART SÖRBY, citizen of Norway, residing at Skytebanen, Kongsberg, Norway, have invented certain new and useful Improvements in Educational Appliances for Practicing Penmanship, of which the following is a specification.

The present invention relates to educational appliances for the practicing of a correct writing of letters of the alphabet and other characters.

The object of the invention is to accustom the hand mechanically to follow the correct lines of the different letters and other characters, so that the drawing up after a copy-slip is avoided. A further object of the invention is to accustom the pupil to excercise the pressure upon the correct parts of the letter.

With these objects in view the letters and other characters are engraved or hollowed out in plates of a suitable material, so that their lines or curves may be followed with a suitable pin or the like. In such places in which the lines have to be written with pressure, the trace or groove is deepened, so that the pin sinks deeper when following the groove.

It is also suitable upon the plates near by the engraved letters to indicate in which direction the writing has to take place and in which succession the different strokes or parts of a letter have to be taken. This may be effected by marking the different parts of a letter with numbers, which are placed near by the different spots, upon which the drawing up of the several parts of the letter has to begin.

The invention also has for its object to provide a suitable pin or pencil to be used when practicing the writing.

The invention is illustrated in the accompanying drawing, in which:

Figure 1 shows the practice—or exercise—plate for the letter —S—, seen from above.

Figure 2 is a section after the line II—II of Figure 1.

Figure 3 is a section after the line III—III of Figure 1.

Figure 4 shows the exercise-plate for the letter —F—.

Figure 5 shows a suitable exercise-pin for practicing the writing.

The different letters and other characters which shall be practiced are engraved upon or hollowed out in plates —1— of a suitable material, preferably brass. The trace or groove is preferably V-shaped in cross-section as will distinctly be seen in Figure 2. The bottom of the engraved groove is however not plane or horizontal, but is — as will be seen from Figure 3 — sunk at such parts —2— of the same, which has to be written under increased pressure. The point of beginning may be marked with an engraved "a" or "1". If the letter in question has to be written in more strokes, the point of beginning of the different strokes are marked in the succession, in which they shall be written with "a", "b", "c", etc., resp., "1", "2", "3", etc., as will be seen from Figure 4, which shows the exercise plate for the letter —F—.

By following the engraving or groove with a suitable pin the hand will become accustomed to the correct drawing up of the different strokes, and will also, owing to the inclined bottom of the groove, be accustomed to lay increased pressure upon the correct places.

For the exercise a pin of any suitable kind may be used, such, for instance, as the one shown in Fig. 5 and indicated by the numeral 3. The point must not be too sharp so as to cause scratches in the groove and it may be kept in a suitably sharpened condition by means of a file. The tendency of the extreme point of the pin to wear away incident to prolonged use of the device is minimized by the cross sectional V-shape of the groove, the inclined side walls of which wear down the sides of the pin and maintain the point in proper condition. Furthermore, the cross sectional V-shape of the groove maintains the point in proper centered position therein and enhances the efficiency of the appliance.

Having now particularly described and ascertained the nature of my said invention and in what manner the same is to be performed, I declare that what I claim is:—

1. An educational appliance for practicing penmanship consisting of a plate having grooves therein representative of the characters used in penmanship and constituting guides for an exercising implement, said grooves being V-shaped in cross section whereby to insure centering of the exercising implement therein.

2. An educational chart for practicing penmanship consisting of a plate having grooves therein representative of characters used in penmanship and constituting guides for an exercising implement, the several grooves composing the character having indicia arranged at the starting point of the several grooves, said indicia denoting the succession in which the strokes composing the character should be made.

3. An educational appliance for practicing penmanship consisting of a plate having grooves therein representative of characters used in penmanship and constituting guides for an exercising implement, portions of said grooves being increased in depth at points corresponding to those at which pressure should be exerted in writing the character, the grooves being V-shaped in cross section and the several strokes composing the character having numerals placed at the starting point, said numerals being arranged in the succession in which the strokes should be made.

In testimony whereof I affix my signature.

SIGVART SÖRBY.

Witnesses:
 AXEL LAHN,
 HAUS HALL.